Patented Nov. 30, 1943

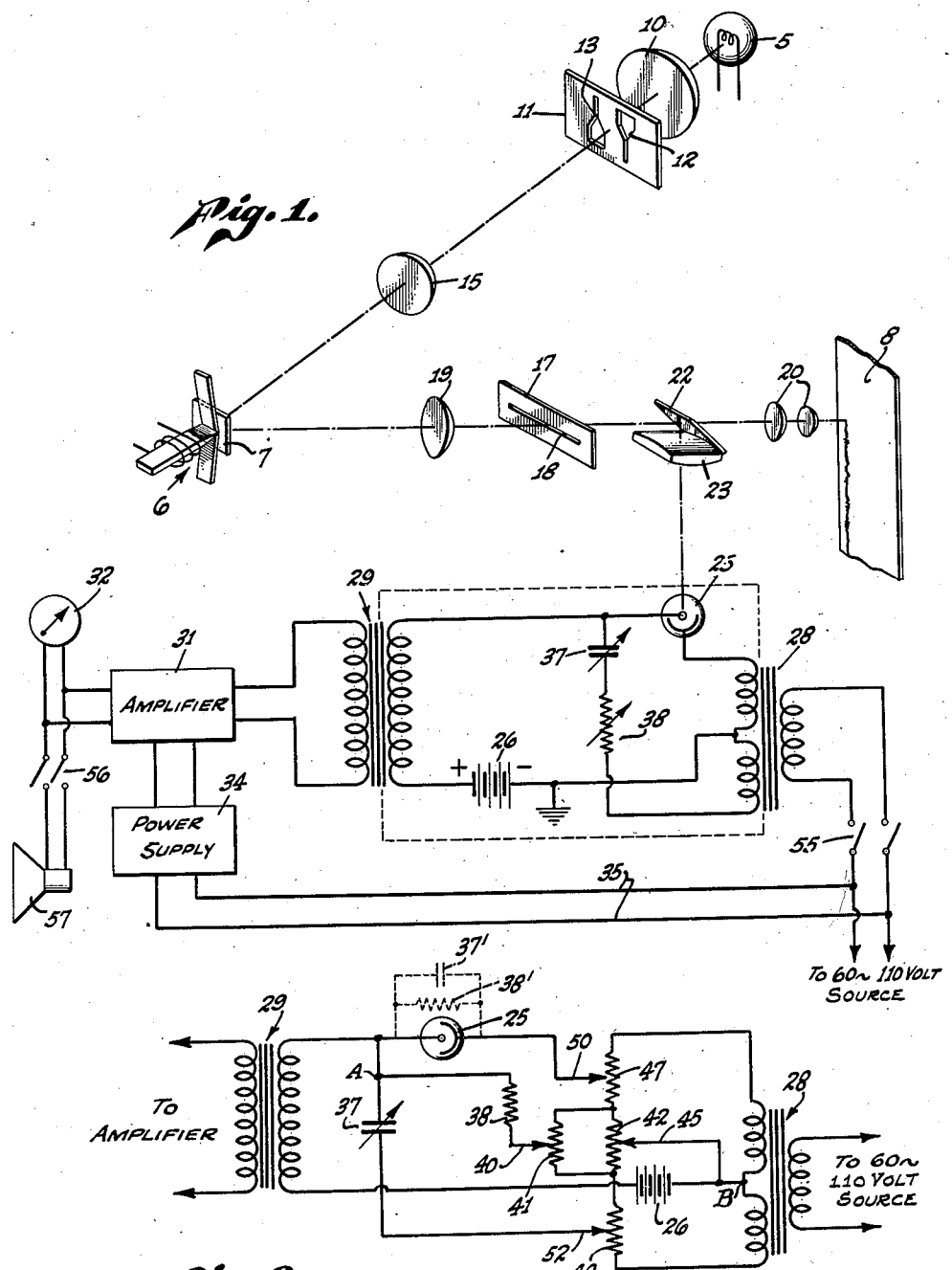

2,335,621

UNITED STATES PATENT OFFICE 2,335,621

PHOTOMETER

Walter S. Thompson and Frederick G. Albin, Los Angeles, Calif., assignors to Radio Corporation of America, a corporation of Delaware Application May 23, 1941, Serial No. 394,857

7 Claims. (Cl. 88—23)

This invention relates to light measuring systems and particularly to a testing or measuring system for determining the recording or reproducing light quanta or intensity of motion picture apparatus.

In the art of photographic sound record recording and reproduction, a light beam of constant intensity is generally employed, this beam being modulated by the movement thereof or light valve action thereon in the case of recording, and by the sound track in the case of reproduction. In each case, however, and particularly in sound recording, it is extremely important to keep the light beam of a constant intensity when it should be constant. Inasmuch as any change in the light intensity or quanta due to the deterioration of the light source or maladjustment will be evidenced in the reproduced sound as distortion, background noise, or change in the average level of the sound, an accurate and stable system of measuring the light quanta or the intensity of the beam, if the area is fixed, is required. Furthermore, the beam should be measured at the point of use or as near as possible to this point, such as the point of contact between the beam and the film, and at this point the quanta of light is not particularly large. Thus, a system of accurately measuring small differentials in light quantas or intensities is necessary.

The principal object of the invention, therefore, is to increase the effectiveness of a photometer.

Another object of the invention is to increase the effectiveness of a photoelectric cell in measuring small differentials in light quantas and intensities falling thereon.

A further object of the invention is to improve the measurement of the light quantas or intensities in sound recording or reproducing systems.

Another object of the invention is to vary the polarizing potential on a photoelectric cell to increase its effectiveness for the measurement of fixed or mean light intensities.

Another object of the invention is to provide a neutralizing circuit for a photoelectric cell polarized with a varying potential.

Although the novel features which are believed characteristic of this invention are pointed out with particularity in the appended claims, the manner of its organization and the mode of its operation will be better understood by referring to the following description read in conjunction with the accompanying drawing forming a part thereof, in which Fig. 1 is a combination diagrammatic-schematic drawing of a sound recording system involving the invention; and Fig. 2 is a modification of the photocell polarizing circuit shown within the dot-and-dash lines of Fig. 1.

Referring now to Fig. 1, the essential elements of a sound recording system are shown as involving a source of light 5, a light modulating galvanometer 6, with a mirror 7 and a sensitive film 8. The light from the lamp 5 is collected by lens 10 and projected on a mask 11 having apertures 12 and 13 therein. The light passing apertures 12 and 13 is projected upon the mirror 7 by a lens 15, from which it is projected to a slit mask 17 with a slit 18 therein by a lens 19. The light passing the slit 18 is projected on the film 8 by objective lenses 20.

Interposed between the slit mask 17 and projection lenses 20 is a dichromic reflector 22 and projection lens 23, such a reflector system being disclosed and claimed in copending application of G. L. Dimmick, Serial No. 332,670, filed May 1, 1940, now Patent 2,289,054, July 7, 1942. The principal feature of such a reflecting system is that it may remain in the recording system during operation since it transmits to the film a high percentage of the light useful for recording, and reflects to the monitoring device a high proportion of the light which is not desired for recording but which is satisfactory for monitoring.

The light reflected from the reflector 22 is projected by the lens 23 onto a photoelectric cell 25 fixedly polarized by a battery 26 over a circuit including the upper half of the secondary of a transformer 28 and the primary of a transformer 29. This circuit provides a fixed polarizing potential on the cell 25. Also impressed on the cell 25 is a 60-cycle alternating current from the power supply connected to the primary of the transformer 28. The output of the photoelectric cell circuit is transmitted through transformer 29 to an amplifier 31 and then to a rectifying meter 32, such as disclosed in J. L. Fields copending application Serial No. 338,033, filed May 31, 1940. Direct current potentials are supplied to the amplifier 31 from a power supply 34 connected to the power source over conductors 35.

Although the use of sensitive photometers having a fixed polarizing potential is well known, it is also known that these systems are not particularly stable due to the inefficiency of direct current amplifiers used therewith as compared to alternating current amplifiers. The accuracy and reliability of light measuring systems dependent upon such direct current amplifiers are not sufficient for the purpose of measuring the light beam quanta or intensity differentials of sound recording and reproducing systems. It was found, however, by applying to the photocell polarizing circuit, an alternating voltage which varied the cell polarizing potential, an alternating current amplifier of high efficiency could be employed. The cell current could be efficiently transmitted through a transformer such as 29, accurately and reliably amplified in an amplifier such as 31, and thus read on a meter such as 32 with dependability.

However, by the application of alternating potentials on the electrodes of the cell, the internal impedance thereof had to be taken into consideration since a photocell such as 25 has a finite admittance composed of a definite capacitance and a substantially fixed conductance when dark in addition to a conductance which varies proportionately with the quanta or intensity of the light falling on its cathode. Thus, to satisfactorily utilize the advantage of A. C. polarization of the cell for photometer purposes, wherein the conductance varies proportional to the incident light, the dark admittance of the cell and circuit has to be neutralized.

Neutralization is accomplished in the system of Fig. 1 by variable capacity 37 to counterbalance the capacitance of the cell and a variable resistance 38 to offset the dark current resistance, the varying resistance component being the change which is to be measured. The values of these neutralizing elements are of course dependent upon the particular type of photoelectric cell employed, the physical disposition of the elements with respect to one another, and the values of the capacitance and resistances of the other elements of the system. For one satisfactory system the condenser 37 had a value of approximately 15 mmfd. and the resistance 38 had a value of approximately 40 megohms, the photoelectric cell being an RCA 920. Although the condenser 37 is for the purpose of neutralizing the capacitance of the cell, and the resistance 38 approximates the direct current resistance of the cell when dark, it will be noted that the lower half of the secondary of transformer 28 is also connected in series with these elements. This is for the purpose of providing a potential to the photocell circuit opposite in phase to the polarizing potential obtained from the upper half of the same secondary of the transformer.

Such a neutralizing circuit has been found practical but is limited to the neutralization of the cell admittance at only one frequency. It is well known that substantially all alternating current sources are not pure tones but have a certain harmonic content, these harmonics being higher in frequency than the fundamental but of reduced amplitude and ordinarily disregarded. In the present system, however, the amplitude of the fundamental is reduced approximately 40 db. by the neutralizing circuit, which is not the case for the harmonics. Thus, the higher harmonics may be of such a proportion that if not also neutralized, serious inaccuracies are introduced in the measuring system. It has also been found that because of the use of such a high value of resistance 28, it is difficult to produce any variation thereof in a practical manner. Thus, a modified neutralizing circuit is shown in Fig. 2, which will now be described.

In Fig. 2 the input transformer 28, output transformer 29, fixed potential source 26, condenser 37 and resistor 38 are the same as in Fig. 1. Since the resistor 38 is now connected in parallel with the condenser 37 and the potential applied to it may be much lower, this resistor may have a much lower value than when connected in series with the condenser 37 as shown in Fig. 1. The actual value of this resistor as used in Fig. 2 was approximately 20 megohms. It will be noted that the potential source 26 is again connected to the midpoint of the secondary of transformer 28 at point B and through the primary of transformer 29 to the cell 25 at point A. This arrangement more accurately simulates the internal capacitance and resistance of the cell 25, as illustrated by condenser 37' and resistance 38', shown in dotted lines connected across the cell.

The remaining portion of the circuit comprises a connection from resistor 38 to slider 40 on a resistor 41. Shunting the resistor 41 is a second resistor 42 with its contacting slider 45. Connected in series on either side of resistor 42 are resistors 47 and 48, all of which are connected in series with the secondary of the transformer 28. Sliders 50 and 51 operate on resistors 47 and 48, respectively. In a circuit employing an RCA 920 photocell, the resistor 41 had a value of 20 ohms, the resistor 42 had a value of 50 ohms, while resistors 47 and 48 were 250 ohms each.

The above-described neutralizing circuit has been found to provide substantially complete neutralization of all frequencies in the photocell polarizing source. The various adjustments function to accomplish this result as follows:

The resistor 42 and its corresponding slider 45 permit a reverse phase potential to be applied through the 20 megohm resistor 38 to the point A with respect to the point B, which compensates for the real (in phase) current component through the condenser circuit. Also, this adjustment provides for neutralization of a negative resistance condition in the circuit when light is removed from the photocell. The resistor 41 with its appropriate slider 40 provides a potential adjustment for the resistance component balance of the cell. The resistor 47 and slider 50 vary the original applied potential to the cell, while the resistor 48 and slider 52 provide adjustment for the capacitance component balance of the cell since the slider 52 is connected in series with the condenser 37. It will be noted that the values of the resistors 41 and 42 are low, thus providing a very accurate and fine adjustment for the cell impedances.

Therefore, the balancing circuit of Fig. 2 has three distinct advantages over the single frequency neutralizing circuit of Fig. 1. These advantages might be stated as (1) the circuit of Fig. 2 is good for all A. C. polarizing frequencies, and the neutralization of all the harmonics of any one source is simultaneously obtained; (2) independent adjustments are provided for the capacitance and resistance components of the photoelectric cell circuit; and (3) the controls for the resistance and capacitance components are at substantially ground potentials, thus making the circuit less susceptible to extraneous influences such as variations produced by proximity of the hand to the photometer.

There is provided, therefore, a photometer system which may remain in a recording or reproducing system at all times without materially decreasing the effectiveness of the recording or reproducing action and which will provide an extremely sensitive and accurate indication of small changes in the steady value of the constant or mean intensity of a light beam.

It will be noted that a switch 55 is in the primary circuit of transformer 28 and a switch 56 is in a branch of the output circuit of amplifier 31 connecting the amplifier 31 to a loudspeaker 57. Thus, with the switch 55 open and the switch 56 closed, the photometer system may be used for audible monitoring of the recorder. When a light measurement is to be made, it is only necessary to close switch 55, switch 56 being either opened or closed.

We claim as our invention:

1. A photometer comprising a source of light, means for forming light from said source into a beam, a photosensitive device, means for projecting a portion of said beam on said device, means for applying a direct current voltage on said device, means for cyclically varying said voltage, an alternating current amplifier connected to said device, means for neutralizing the capacitance of said device, means for adjusting the voltage applied to said capacitance neutralizing means, means for neutralizing the resistance of said device, means for adjusting the voltage applied to said resistance neutralizing means, and means for varying the phase of the cyclically varying voltage applied to said device.

2. A photometer in accordance with claim 1, in which said capacitance neutralizing means comprises a condenser having a value substantially equal to the capacitance of said device, said resistance neutralizing means comprises a resistance having a value approaching that of the resistance of said device, and said phase adjusting means comprises a potentiometer connected across said means for cyclically varying the voltage on said device.

3. A photometer comprising a light sensitive device having a substantially fixed internal capacitance, a substantially fixed value of resistance when dark and a resistance adapted to vary with light variations impressed thereon, a direct current source of polarizing potential connected to said device, a cyclically varying source of potential connected to said device, a condenser and a resistor connected to said device and to said cyclically varying source of potential for neutralizing said internal capacitance and resistance of said device at all frequencies of variation of said cyclically varying source of potential, the potential applied to said condenser being independently variable with respect to the potential applied to said resistor, and means for varying the phase of the cyclically varying potential applied to said device.

4. A photometer in accordance with claim 3, in which said last-mentioned means comprises a potentiometer connected across said cyclically varying source of potential, one terminal of said light sensitive device being variably connected to one end of said potentiometer, one terminal of said condenser being variably connected to the other end of said potentiometer, and said resistor being effectively connected to the center of said potentiometer.

5. A light measuring system comprising a photocell, a source of direct current potential for said cell, a source of cyclically varying potential for said cell superimposed on said direct current, means for measuring the average variations of resistance in said cell, means for neutralizing the capacitance and resistance of said cell at all frequencies of said cyclically varying potential source, means for supplying said capacitance neutralizing means with the voltage independently variable with respect to the voltage applied to said resistance neutralizing means, and means for varying the phase of the cyclically varying potential applied to said cell.

6. A light measuring system in accordance with claim 5, in which said capacitance neutralizing means and its voltage supply are in shunt with said resistance neutralizing means and its voltage supply, and a potentiometer is connected across said cyclically varying source of potential.

7. A light measuring system in accordance with claim 5 in which said capacitance neutralizing means includes a condenser and said resistance neutralizing means includes a resistor and said phase adjusting means includes a potentiometer connected across said cyclically varying potential source.

WALTER S. THOMPSON.
FREDERICK G. ALBIN.